United States Patent [19]
Bicknell et al.

[11] Patent Number: 6,011,803
[45] Date of Patent: Jan. 4, 2000

[54] DISTRIBUTED-PROTOCOL SERVER

[75] Inventors: Rainie M. Bicknell; Benny J. Ellis, both of Westminster; Richard P. Moleres, Louisville, all of Colo.

[73] Assignee: Lucent Technologies Inc., Murray Hill, N.J.

[21] Appl. No.: 08/784,729

[22] Filed: Jan. 13, 1997

[51] Int. Cl.[7] .................................. H04J 3/16; H04J 3/22
[52] U.S. Cl. ......................... 370/467; 370/469; 370/522; 709/224; 709/230
[58] Field of Search ...................................... 370/235, 241, 370/466, 901, 912, 250, 20.1, 469, 503, 467, 401, 410, 522, 524; 371/20.1; 395/200.54; 709/224, 227, 230

[56] References Cited

U.S. PATENT DOCUMENTS

| | | | |
|---|---|---|---|
| 5,007,051 | 4/1991 | Dolkas et al. | 370/235 |
| 5,027,343 | 6/1991 | Chan et al. | 370/250 |
| 5,182,750 | 1/1993 | Bales et al. | 714/22 |
| 5,235,597 | 8/1993 | Himwich et al. | 370/469 |
| 5,289,469 | 2/1994 | Tanaka | 370/469 |
| 5,473,771 | 12/1995 | Burd et al. | 709/248 |
| 5,509,121 | 4/1996 | Nakata et al. | 709/230 |
| 5,732,213 | 3/1998 | Gessel et al. | 395/200.54 |
| 5,793,771 | 8/1998 | Darland et al. | 370/467 |
| 5,802,146 | 9/1998 | Dulman | 379/34 |

FOREIGN PATENT DOCUMENTS

| | | | |
|---|---|---|---|
| 0666670 | 8/1995 | European Pat. Off. | H04L 29/06 |
| 9641434 | 12/1996 | WIPO | H04J 3/02 |

OTHER PUBLICATIONS

Posefsky, D. et al., "Multiprotocol Transport Networking: Eliminating Application Dependencies on Communications Protocols", IBM Systems Journal, vol. 34, No. 3, Jun. 21, 1995, pp. 472–499.

Sevick, M. et al., "Customers in Driver's Seat: Private Intelligent Network Control Point", ISS '95, World Telecommunications Congress, vol. 2, No. SYMP. 15, Apr. 23, 1995, pp. 41–44.

Z. Grigonis, Force Computers Hits the Expo with Full Force—Three New Computers Debut, Computer Telephony, vol. 4, Iss. 4, Apr. 1996, pp. 96–97.

(List continued on next page.)

*Primary Examiner*—Ahmad F. Matar
*Assistant Examiner*—Khanh Quang Dinh
*Attorney, Agent, or Firm*—David Volejnicek

[57] ABSTRACT

A distributed processing system (100) includes a protocol server (101) that enables a plurality of clients (103–104) to share the use of one set of Signaling System 7 (SS7) links (99), that centralizes the link-termination circuitry (110) for use by the plurality of clients, and that provides access to upper layers (215–219) of the SS7 protocol stack (200) by distributing the processing of different layers of the stack between the protocol server and the clients. The protocol server terminates the lower layers (210–213) of the SS7 protocol, while each client terminates the upper layers of the SS7 protocol. Communication between the protocol server and the clients of information expressed in the upper layers of the SS7 protocol is effected via the TCP/IP protocol over a LAN (102). A service access bridge process (113, 116) in the protocol server translates between the lower layers of the SS7 protocol and the TCP/IP protocol, and a distributed signaling server process (114, 117) in the protocol server routes communications across the LAN. A distributed signaling client process (121, 124) in each client translates between the TCP/IP protocol and the upper layers of the SS7 protocol. The distributed signaling server and distributed signaling client processes are substantially protocol independent, allowing for use of any protocol in place of the SS7 protocol. The distributed processing system may be either a multiprocessor or a uniprocessor.

15 Claims, 2 Drawing Sheets

OTHER PUBLICATIONS

Advertisement: AccessManager™, AccessManager/Advanced™, AccessServices™, AccessMultimedia™, EBS, Engineering and Business Systems, Inc., pp. 1–8, 1994.

N. Olsen, Designing a Real–time Platform for Rapid Development, EBS, 2 Enterprise Dr., Shelton, CT., 06484, pp. 1–5, 1994.

D. Inan and T. Thorson, EBS and Motorola Computer Group Join Forces to Expand Cellular Intelligent Network Worldwide, EBS, San Diego, CA, Mar. 2, 1994, 3 pages.

Advertisment: AccessStation, Telephone Engineer & Management (TE&M), Nov. 15, 1993, 2 pages.

Advertisement: Acess™ Technology's Fully Integrated SS7 World, AccessManager's Complete SS7 Protocol Stack, EBS, 12 Cambridge Dr., 1987 Trumbull, CT 06611, 2 pages.

Advertisement: Network Intelligence Reaches the End–User, SS7 Strategies, EBS, 12 Cambridge Dr., Trumbull, CT 06611, 2 pages, Apr. 1996.

Advertisement: A Safer Way to Roam, SS7, EBS, 12 Cambridge Dr., Trumbull, CT 06611, 2 pages, Apr. 1996.

Advertisement: The Programmable Switch for PCS, EBS, 12 Cambridge Dr., Trumbull, CT 06611, 2 pages, Apr. 1996.

T. Dillon, How to Make the Intelligent Network Work for You, Telephony, Jun. 7, 1993, Intertec Publishing Corp., Chicago, IL., 6 pages.

Advertisement: Interactive Computing Meets the Challenges of Telecommunications Networks, Total SS7, Call Control & AIN Solutions, EBS, 2 Enterprise Dr., Shelton, CT 0648, 8 pages, 1994.

Jabbari et al, Comparison of TSS Application Layer Protocols: TCAP (Q.771–775) and Rose (X.219/X.229), 1993 IEEE, 1039–1044, 1993.

Modarressi et al, Signaling System No. 7, A Tutorial 1990 IEEE, 19–35, Jul., 1990.

Manfield et al, Congestion Control in SS7 Signaling Network 1993 IEEE, 50–57, Jun., 1993.

Lazar et al, Scalable and Reusable Emulator for Evaluating the Performance of SS7 Network, 1994 IEEE, 395–404, Apr., 1994.

Chatras et al, "Remote Operations: From a Generic Model to the OSI and ITU SS7 Realizations", IEEE 1994, 634–638.

6,011,803

DISTRIBUTED-PROTOCOL SERVER

TECHNICAL FIELD

This invention on relates generally to telecommunications, and specifically to telecommunications protocol servers.

BACKGROUND OF THE INVENTION

A processor may have to communicate with a remote facility in order to perform its intended functions. These communications are carried out via a remote-communications protocol. An illustrative example of such a processor is a call-processing adjunct processor of a central office switch which must communicate with a database of telephone numbers via the Signaling System 7 (SS7) in order to perform its call-processing functions. The processing load may exceed the processing capacity of a single processor, in which case the processing load is often distributed among a plurality of the processors. An illustrative such distributed processing system is disclosed in U.S. Pat. No. 5,473,771. In that case, each of the processors typically needs its own communications link to the remote facility, as well as its own circuitry for terminating the link, in order to perform these functions. This is inefficient and costly: not only must the link and the link-terminating circuitry be replicated for each processor, but charges for the use of these links are typically incurred on a per-link basis. It would therefore be more efficient and less expensive if the plurality of processors could share the use of one or only a few communications links.

Distributed processing systems wherein a plurality of more-or-less co-located processors shares the system's processing load and is interconnected by a local area network (LAN), and wherein one of the processors acts as a communications server (e.g., an input/output processor) for all of them, are well known in the computer art. Such a system may be used to reduce the number of communications links and link-terminating circuits and thereby obtain the above-mentioned efficiency and cost reduction. However, it may create problems of its own. Firstly, the communications protocol of the LAN is not likely to be the same protocol as is used on the remote-communications link. If the processing application that the system performs is protocol-dependent—as is, for example, the call-processing application described in U.S. Pat. No. 5,182,750—the application must be redesigned and reimplemented to accommodate the difference in protocols. This is often a time-consuming and a costly proposition. Secondly, the full termination of the remote-communications link's protocol may consume significant amounts of processing power, and hence create a processing bottleneck at the communications server if the communications link is heavily used. To lessen the bottleneck, a plurality of communications servers may be used in parallel, but this negates many of the benefits that were gained by using a communications server in the first place!

Alternatively, the abovementioned U.S. Pat. No. 5,182, 750 teaches that different layers of a protocol may be processed on different processors. But even the teaching of that patent does not point the way out of the processing-bottleneck dilemma, for two reasons. First, it requires the inter-processor communications protocol to be the same as the protocol whose different layers are processed by the different processors. But, as was mentioned above, the communications protocol of the LAN is not likely to be the same protocol as is used on the remote-communications link. And second, it requires the protocol to be fully terminated on all of the processors. But it is the full termination of the protocol by the communications server in the scenario under discussion here that is presumed to have caused the processing bottleneck in the first place!

SUMMARY OF THE INVENTION

This invention is directed to solving these and other problems and deficiencies of the prior art. Generally according to the invention, a distributed processing system includes a communications protocol server that enables a plurality of client processing entities (e.g., separate processors) to share the use of one or more remote-communications links, that centralizes the link-termination circuitry for use by the plurality of processing entities, and that provides access to portions (layers of the protocol stack) of the protocol by the plurality of processing entities by distributing the processing of different layers of the protocol stack between the protocol server and the clients. Further generally according to the invention, the distributed processing system is a communications apparatus that comprises the protocol server which connects to a first communications link (e.g., a Signaling System 7 (SS7) link) having a multi-layer first communications protocol (e.g., the SS7 protocol), which communicates across the first link via the first protocol, and which terminates only lower layers of the first protocol. The protocol server further connects to a second communications link (e.g., a LAN or an inter-process communications arrangement) having a second communications protocol (e.g., the TCP/IP protocol) different from the first protocol, and communicates information expressed in only upper layers of the first protocol across the second link via the second protocol. The communications apparatus further comprises a client which connects to the second link, which communicates the information expressed in only the upper layers of the first protocol across the second link via the second protocol. and which terminates only the upper layers of the first protocol.

Advantageously, the protocol server allows the distributed protocol to be changed, or additional protocols to be added, without inclusion in each client processor or other processing entity of specialized hardware and firmware for terminating the protocol or protocols and software for processing the entire protocol or protocols. To change the protocol, typically it is only necessary to change out the software that processes the protocol and the protocol-specific portions of the arrangements that facilitate client-server (e.g., over-the-LAN) communications between the protocol-processing software. But the fundamentals of the arrangements that facilitate the client-server communications remain the same for all protocols. The protocol server thereby enables quick development and deployment of processing applications that require different communications protocols, without a major investment of time and money in the development of hardware, firmware, and/or software for supporting the different communications protocols.

According to one aspect of the invention, a communications apparatus comprises: a server for communicating over a first communications link that has a first communications protocol comprising a plurality of protocol layers, the server for terminating only lower layers of the first communications protocol, a second communications link that has a second communications protocol different from the first communications protocol and that is connected to the server, and at least one client of the server connected to the second communications link, for executing an application that uses the first communications protocol to communicate and for terminating only upper layers of the first communications protocol, and wherein the server and the at least one client each communicate communications expressed in the first communications protocol between the server and the at least one client over the second communications link by using the second communications protocol.

According to another aspect of the invention, there is provided a server for a client-server communications apparatus that comprises a first communications link, a second communications link, and at least one client of the server connected to the second communications link for executing an application that communicates by using a first communications protocol having a plurality of protocol layers and for terminating only upper layers of the first communications protocol, the client for communicating communications expressed in the first communications protocol over the second communications link by using a second communications protocol different from the first communications protocol. The server comprises a first arrangement connected to the first communications link for communicating over the first communications link by using the first communications protocol and for terminating only lower layers of the first communications protocol, and a second arrangement connected to the first arrangement and to the second communications link for communicating communications expressed in the first communications protocol between the server and the at least one client over the second communications link by using the second communications protocol.

According to yet another aspect of the invention, there is provided a client for a client-server communications apparatus that comprises a first communications link, a second communications link, and a server connected to the first communications link for communicating over the first communications link by using a first communications protocol that comprises a plurality of protocol layers and for terminating only lower layers of the first communications protocol, the server connected to the second communications link for communicating communications expressed in the first communications protocol over the second communications link by using a second communications protocol different from the first communications protocol. The client comprises a first arrangement for executing an application that uses the first communications protocol to communicate and terminating only upper layers of the first communications protocol, and a second arrangement connected to the first arrangement and to the second communications link for communicating communications expressed in the first communications protocol between the server and the client over the second communications link by using the second communications protocol.

According to a further aspect of the invention, a method of communicating in a client-server communications apparatus comprising a first communications link, a second communications link, a server connected to both the first communications link and the second communications link, and a client of the server connected to the second communications link and executing an application that communicates by using a first communications protocol having a plurality of protocol layers, comprises the steps of terminating only upper layers of the first communications protocol at the client, communicating communications that are expressed in the first communications protocol between the client and the server over the second communications link by using a second communications protocol different from the first communications protocol, and terminating only lower layers of the first communications protocol on the first communications link at the server.

These and other advantages and features of the invention will become more apparent from the following description of an illustrative embodiment of the invention taken together with the drawing.

DETAILED DESCRIPTION

Figure 1:
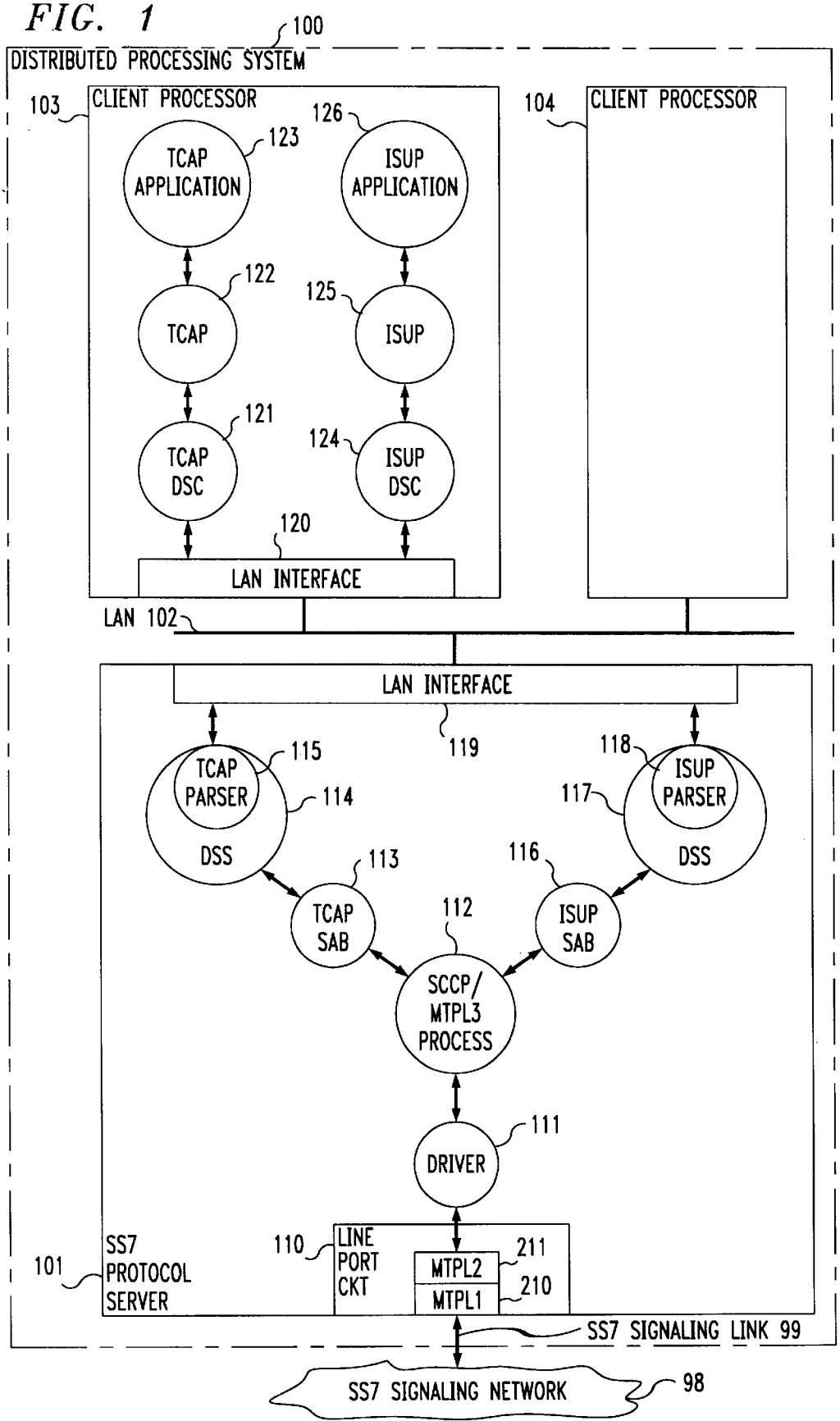
FIG. 1 is a block diagram of an illustrative distributed processing system that embodies an illustrative implementation of the invention.

FIG. 1 shows an illustrative distributed processing system 100 constructed according to the invention. Processing system 100 is illustratively a call-processing adjunct to a telephone network switch. System 100 includes one or more client processors 103–104 and one or more Signaling System 7 (SS7) protocol servers 101. Client processors 103–104 and protocol server 101 are interconnected by communications link, such as a local area network (LAN) 102 or some other communications medium, and operate in a conventional client-server mode of operation. Illustratively, client processors 103–104 are Lucent Technologies Inc. MAP interactive voice response units and protocol server 101 is illustratively either a MAP unit or a general-purpose computer. Also illustratively, LAN 102 implements the Transfer Control Protocol/Internet Protocol (TCP/IP) communications protocol. Protocol server 101 provides remote-communications for client processors 103–104 with a SS7 signaling network 98 via a communications medium such as one or more SS7 signaling links 99. Protocol server 101 terminates signaling links 99 via a link port circuit 110. Link port circuit 110 is illustratively a Performance Technologies high-speed communications link circuit board. Protocol server 101 implements lower layers of the SS7 signaling protocol, while client processors 103–104 implement upper layers of the SS7 signaling protocol.

While shown as a multiprocessor in FIG. 1, distributed processing system 100 may alternatively be either a uniprocessor wherein the processors 101 and 103–104 shown in FIG. 1 constitute separate processing software modules, or a hybrid system wherein some processors are separate physical processors while other processors are separate processing software modules on a single physical processor. For purposes of inter-module communications on a single physical processor, LAN 102 and its communications protocol are replaced by an inter-module communications protocol of the single physical processor.

Figure 2:
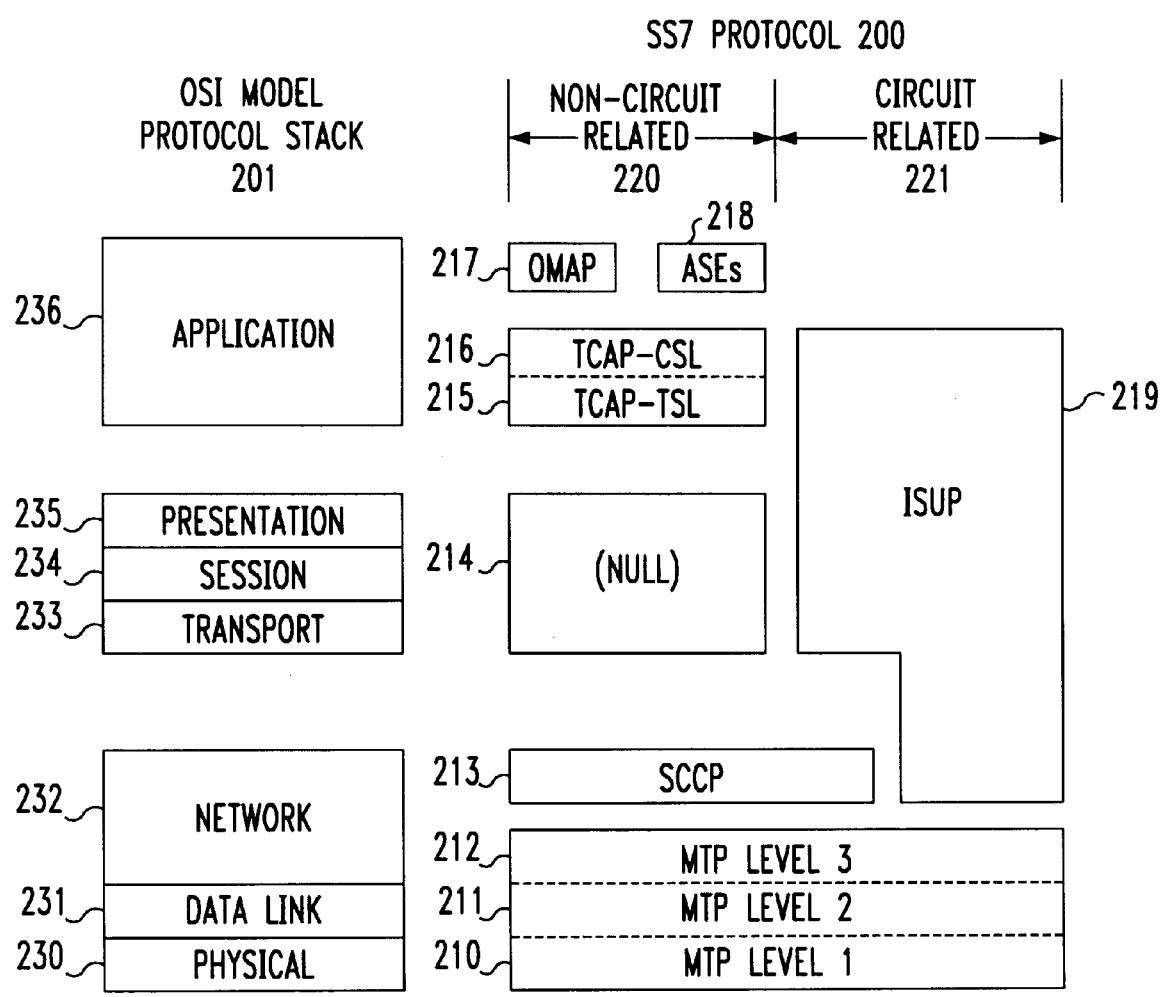
FIG. 2 is a block diagram showing the mapping of the signaling system 7 (SS7) protocol into the International Standards Organization's (ISO's) Open System Interconnect (OSI) model protocol stack.

Turning to FIG. 2, it shows the layers that make up the SS7 signaling protocol 200. For ease of understanding of how the invention may be applied to other protocols, FIG. 2 also shows how the layers of protocol 200 map into the layers of the International Standards Organization's (ISO's) Open System Interconnect (OSI) model protocol stack 201. The OSI model protocol stack 201 comprises seven protocol layers 230–236. Illustratively, these layers are described in U.S. Pat. No. 5,182,750.

SS7 protocol 200 supports both circuit-related applications and non-circuit related applications. Accordingly, the SS7 protocol 200 has a circuit-related protocol stack 221 and a non-circuit-related protocol stack 220. Both stacks 220 and 221 include the message transfer part (MTP) 210–212. The function of the MTP 210–212 is to provide reliable transfer and delivery of signaling information. MTP level 1 is a signaling data link 210, that corresponds to the OSI's physical layer 230. It is a full-duplex facility operating at either 56 Kbps, 64 Kbps, or 1.5 Mbps. MTP level 2 is made up of signaling-link functions 211, which correspond to the OSI data link layer 231. Functions 211 provide error-monitoring, error-correction, and flow-control capabilities. MTP level 3 is made up of signaling network functions 212, which correspond to a portion of the OSI network layer 232. Functions 212 provide message-routing functions, and network-reconfiguration functions for failure and blockage cases.

At this point, circuit-related stack 221 and non-circuit-related stack 220 diverge. Non-circuit related stack 220 includes a Signaling Connection Control Part (SCCP) 213, which corresponds to the remainder of the OSI network layer 232. SCCP 213 enhances the addressing capabilities of MTP 210–212, allowing messages to be delivered to sub-systems within a node, such as within distributed processing system 100. SCCP 213 also handles global title translation, converting global titles—such as dialed digits of a telephone number—into MTP addresses. Furthermore, SCCP 213 provides classes of service for messages, determining whether a datagram service is used, whether a virtual connection is used, what message ordering (if any) is required, and what flow-control and recovery procedures are used.

Circuit-related stack 221 comprises an ISDN User Part (ISUP) 219, which corresponds to a portion of the OSI network layer 232 and to the OSI transport, session, presentation, and application layers 233–236. ISUP 219 provides message sequences for call set-up and call tear-down, similar to those used for ISDN PRI. They carry information parameters similar to those used within the ISDN PRI information elements (IEs). (While most messages between ISUP 219 and MTP level 3 212 pass directly between them, ISUP 219 has a capability (Temporary Signaling Connections) that can force selected call-related messages to pass through SCCP 213 to route these messages to the correct processes.)

Non-circuit-related stack 220 does not include a layer or layers 214 corresponding to the OSI transport, session, and presentation layers 233–235. Rather, Transaction Capabilities Application Part (TCAP)—Transaction Sub Layer (TSL) portion 215 of stack 220 which corresponds to a portion of the OSI application layer 236 communicates directly with SCCP 213. The function of TCAP-TSL is to maintain a dialogue over the connectionless SS7 network. It provides messages to "begin", "continue", "end", and "abort" a dialogue, plus a "unidirectional" message that is used for one-way information transfer. Dialogues are identified by unique Transaction Identifiers (TIDs). Lying above TCAP-TSL 215 is a TCAP-Component Sub Layer (CSL) 216 which also corresponds to a portion of the OSI application layer 236. The purpose of TCAP-CSL 216 is to transfer sets of requests/responses between TCAP applications. The requests and responses take the form of components which are carried within TCAP-TSL messages, and are passed to the TCAP-CSL. An "invoke" component carries a request to invoke an operation within an application. The response to the request may be a "return result-last", a "return result-not last", a "return error", or a "reject" component, or no response. Requests and responses are correlated by a component identifier (CID). Lying above TCAP 215–216 and also corresponding to a portion of the OSI application layer 236 are an Operations and Maintenance Administration Part (OMAP) 217 and Application Service Elements (ASEs). OMAP 217 terminates remote testing and maintenance inquiries, and can also be used to originate tests and maintenance of remote systems. OMAP 217 may advantageously provide an application programming interface (API) that defines a set of primitive operation, maintenance, and administration tools which can be invoked by applications at appropriate times as dictated by a customer's requirements for interactive testing and maintenance. ASEs use TCAP 215–216 to perform services, applications, and testing.

Returning to FIG. 1, the SS7 protocol 200 is distributed across protocol server 101 and client processors 103–104. Protocol server 101 terminates (ie., implements) the lower layers 210–213 of SS7 protocol 200, while client processors 103–104 terminate the higher layers 215–219 of SS7 protocol 200. The physically-separated layers 213 and 215, 219 are interfaced to each other across LAN 102 by the TCP/IP protocol.

Link port circuit 110 of protocol server 101 terminates MTP layers 1 and 2 210–211 in hardware and firmware. MTP layer 3 212 and SCCP 213 are terminated by a process 112 that executes on protocol server 101. MTP layer 3 212 communicates with MTP layer 2 211 via a conventional operating system device driver 111, which is also a process that executes on protocol server 101. Process 112 is interfaced to a TCAP distributed signaling server (DSS) 114 by a TCAP service access bridge (SAB) 113, and is interfaced to an ISUP DSS 117 by an ISUP SAB 116. Each element 113–114 and 116–117 is implemented as a process that executes on protocol server 101. SABs 113 and 116 act as translators between the communications protocol of SCCP layer 213 and the protocol used by DSSs 114 and 117 (the TCP/IP protocol of LAN 102). In this illustrative example, process 112 communicates with SABs 113 and 116 via shared memory, while SABs 113 and 116 communicate with DSSs 114 and 117 via the TCP/IP protocol. Any other suitable communications scheme could be used, however.

DSSs 114 and 117 act as routing servers for SABs 113 and 116, respectively. Each DSS 114, 117 includes a parser 115, 118, respectively. While DSSs are generic and usable for any protocol, parsers 115 and 118 are the SS7-protocol-dependent portions of DSSs 114 and 117. The function of parsers 115 and 118 is to parse each message received from SABs 113 and 116 to determine which application and which transaction of that application the received message is for or from. This information is then used by DSSs 114 and 117 to decide if the message needs to be routed to a specific client processor 103–104, or if any client processor 103–104 will do, and then to route the message to an intended recipient. Illustratively, each client processor 103–104 is pre-administered with its own unique range of transaction identifiers (XIDs), and each application that executes in the processing system 100 is pre-administered with an application identifier (app ID). Each DSS 114 and 117 has a routing table that correlates each client processor 103–104 with its range of XIDs and with the app IDs of applications that are executing on that client processor. Each message received by DSSs 114 and 117 from SABs 113 and 116 has an app ID and may have an XID. These IDs are extracted by parser 115 or 118. DSS 114 or 117 uses the app ID and XID extracted from the received message to look up in its routing table the destination client processor 103–109 for the message. If a message received by DSS 114 or 117 has only an app ID but has no XID, this means that the message is for a new transaction. DSS 114 or 117 therefore selects (e.g., on a round-robin basis) a client processor 103–104 for this transaction and sends the message to the selected client processor 103–104, which then selects an XID for this transaction from its own range of transaction identifiers.

Extensibility to other protocols is illustratively achieved by the assumption that any message of any protocol contains within it an XID and an app ID, whereupon the SS7 protocol parser can be replaced by the parser of the different protocol.

In the opposite direction of transmission, DSSs 114 and 117 merely pass messages that they receive from client processors 103–104 to SABs 113 and 116.

Communications between protocol server 101 and LAN 102 are conducted in TCP/IP through a LAN interface 119. Similarly, communications between LAN 102 and client processors 103–104 are conducted in TCP/IP through LAN interfaces 120. Each LAN interface 119–120 is a conventional LAN interface circuit.

Each client processor 103–104 has a distributed signaling client (DSC) 121, 124 for each application 123, 126 that executes on that client processor 103–104. Alternatively, DSCs 121 and 124 constitute the applications. DSCs 121, 124 are implemented as processes on a client processor 103–104; a plurality of DSCs 121, 124 may be implemented via one process. DSCs 121, 124 act as protocol translators, translating messages between the TCP/IP protocol of LAN 102 and the communications protocol of the distributed-protocol layer that is served by that DSC 121, 124. Thus, TCAP DSC 121 translates between the TCP/IP protocol and the communications protocol of TCAP layer 215, while ISUP DSC 124 translates between TCP/IP and the communications protocol of ISUP layer 219. The application process, complete with functionality of the protocol upper layers and with functionality of TCP/IP communications is considered to be a DSC. The protocol-specific functionality and the TCP/IP functionality is achieved by loading against a set of libraries (e.g., one for the TCP/IP functionality, one or more for the protocol-specific functionality). When a DSC receives a TCP/IP message, the TCP/IP information is stripped off to reveal a protocol-specific (e.g., SS7) message. The protocol upper layers then parse this message accordingly. Finally, the application logic processes the message.

DSCs 121 and 124 merely translate and pass on to layers 215 and 219 (which are illustratively located in the same process) messages received from LAN interface 120. If processing system 100 has only one protocol server 101, DSCs 121 and 124 also merely translate and pass on to LAN interface 120 messages received from layers 215 and 219. But if processing system 100 has a plurality of protocol servers 101, DSCs 121 and 124 additionally perform a routing function akin to that of DSSs 114 and 117 to select one of the protocol servers. Illustratively, upon receiving a message from TCAP 122 or ISUP 125, DSC 121 or 124 determines from the presence or absence of an XID in the message header whether the message relates to a new or an ongoing transaction. If the message pertains to an ongoing transaction, DSC 121 or 124 addresses it to the protocol server 101 that has been serving this transaction. If the message pertains to a new transaction, DSC 121 or 124 selects (e.g., on a round-robin basis) a protocol server 101 to serve the transaction and addresses the message to the selected protocol server. For this purpose, each DSC 121 and 124 includes a table that lists protocol servers 101 and that contains, for each transaction, the transaction's XID and the ID of the protocol server 101 serving that transaction.

Like DSCs 121 and 124, SS7 protocol layers 215 and 219 are implemented as function libraries 122 and 125, respectively, on client processors 103–104 for use by application processes. Application processes and DSCs 121 and 124 communicate with each other via library calls on libraries 122 and 125, respectively. Libraries 122 and 125 thus interface TCAP applications processes 123 (including OMAP 217 and ASE 218 processes) and ISUP application processes 126, respectively, to DSCs 121 and 124, respectively, in a conventional manner.

Of course, various changes and modifications to the illustrative embodiment described above will be apparent to those skilled in the art. For example, the distributed protocol need not be distributed at the OSI network layer, but may be distributed at any desired layer. Also, any protocols other than the SS7 protocol (for example, the ISDN protocol) may be distributed hereby, at any layer or even within a layer, and by using any suitable inter-client/server protocol other than the TCP/IP protocol (for example, the ATM protocol or the UDP/IP protocol). Furthermore, a plurality of protocols may be distributed simultaneously within the distributed processing system. Additionally, the distributed protocol may be distributed at more than one layer; for example, a lower-layer server could process the lowest protocol layers, an intermediate-layer server could process intermediate protocol layers, and the client processors could process only the upper protocol layers. Such changes and modifications can be made without departing from the spirit and the scope of the invention and without diminishing its attendant advantages. It is therefore intended that such changes and modifications be covered by the following claims.

The invention claimed is:

1. A communications apparatus comprising:

a first processing entity connecting to a first communications link having a multi-layer first communications protocol, for communicating across the first link via the first communications protocol and terminating only lower layers of the first communications protocol, and connecting to a second communications link having a second communications protocol different from the first communications protocol, for communicating information expressed in only upper layers of the first communications protocol across the second link via the second protocol; and a second processing entity connecting to the second link for communicating the information expressed in only the upper layers of the first communications protocol across the second link via the second protocol and for terminating only the upper layers of the first communications protocol.

2. A communications apparatus comprising:

a server for communicating over a first communications link that has a first communications protocol comprising a plurality of protocol layers, the server for terminating only lower layers of the first communications protocol;

a second communications link that has a second communications protocol different from the first communications protocol, connected to the server;

at least one client of the server connected to the second communications link, for executing an application that uses the first communications protocol to communicate, for terminating only upper layers of the first communications protocol; and the server and the at least one client each further for communicating communications expressed in the first communications protocol between the server and the at least one client over the second communications link by using the second communications protocol.

3. The communications apparatus of claim 2 wherein:

the communications expressed in the first communications protocol and communicated over the second communications link are expressed in only the upper layers of the first communications protocol.

4. The communications apparatus of claim 3 wherein:

communications that are communicated over the first communications link are expressed in both the upper layers and the lower layers of the first communications protocol.

5. The communications apparatus of claim 2 wherein:

the server comprises means for routing the communications expressed in the first communications protocol from the server over the second communications link to a recipient indicated by communications received by the server over the first communications link.

6. The communications apparatus of claim 5 comprising a plurality of the servers, wherein:

each client comprises means for routing communications received from the application, from the client over the second communications link to one of the servers indicated by the communications received from the application.

7. A communications apparatus comprising:

a server for communicating over a first communications link by using a first communications protocol that comprises a plurality of protocol layers, on behalf of an application that uses the first communications protocol to communicate, the server for terminating only lower layers of the first communications protocol;

a second communications link connected to the server, at least one client of the server connected to the second communications link, for executing the application and terminating only upper layers of the first communications protocol; and the server and the at least one client each further for communicating communications expressed in the first communications protocol between the server and the at least one client over the second communications link on behalf of the application by using a second communications protocol different from the first communications protocol.

8. The communications apparatus of claim 7 wherein:

the communications expressed in the first communications protocol and communicated over the second communications link are expressed in only the upper layers of the first communications protocol.

9. The communications apparatus of claim 8 wherein:

communications that are communicated over the first communications link are expressed in both the upper layers and the lower layers of the first communications protocol.

10. The communications apparatus of claim 7 comprising a plurality of the clients, wherein:

the server comprises means for routing the communications expressed in the first communications protocol from the server over the second communications link to one of the clients indicated by communications received by the server over the first communications link.

11. The communications apparatus of claim 10 comprising a plurality of the servers, wherein:

each client comprises means for routing communications received from the application, from the client over the second communications link to one of the servers indicated by the communications received from the application.

12. A server for a client-server communications apparatus that comprises a first communications link, a second communications link, and at least one client of the server connected to the second communications link for executing an application that communicates by using a first communications protocol having a plurality of protocol layers and for terminating only upper layers of the first communications protocol, the client for communicating communications expressed in the first communications protocol over the second communication link by using a second communications protocol different from the first communications protocol, the server comprising:

a first arrangement connected to the first communications link for communicating over the first communications link by using the first communications protocol and for terminating only lower layers of the first communications protocol; and a second arrangement connected to the first arrangement and to the second communications link for communicating communications expressed in the first communications protocol between the server and the at least one client over the second communications link by using the second communications protocol.

13. A client for a client-server communications apparatus that comprises a first communications link, a second communications link, and a server connected to the first communications link for communicating over the first communications link by using a first communications protocol that comprises a plurality of protocol layers and for terminating only lower layers of the first communications protocol, the server connected to the second communications link for communicating communications expressed in the first communications protocol over the second communications link by using a second communications protocol different from the first communications protocol, the client comprising:

a first arrangement for executing an application that uses the first communications protocol to communicate and terminating only upper layers of the first communications protocol; and a second arrangement connected to the first arrangement and to the second communications link, for communicating communications expressed in the first communications protocol between the server and the client over the second communications link by using the second communications protocol.

14. A method of communicating in a client-server communications apparatus comprising a first communications link, a second communications link, a server connected to both the first communications link and the second communications link, and a client of the server connected to the second communications link and executing an application that communicates by using a first communications protocol having a plurality of protocol layers, the method comprising the steps of:

terminating only upper layers of the first communications protocol at the client;

communicating communications that are expressed in the first communications protocol between the client and the server over the second communications link by using a second communications protocol different from the first communications protocol; and terminating only lower layers of the first communications protocol on the first communications link at the server.

15. The method of claim 14 wherein:

the step of terminating only upper layers of the first communications protocol comprises the steps of receiving a first communication expressed in a highest layer of the first communications protocol from the application, generating, from the first communication received at the client, a second communication expressed in upper layers of the first communications protocol, generating a third communication expressed in the highest layer of the first communications protocol from a fourth communication expressed in the upper layers of the first protocol at the client, and sending the third communication to the application;

the step of communicating communications that are expressed in the first communications protocol comprises the steps of generating from the second communication at the client a fifth communication expressed in the second communications protocol, transmitting the fifth communication from the client to the server over the second communications link by using the second communications protocol, receiving the fifth communication at the server over the second communications link, regenerating the second communication from the fifth communication at the server, generating a sixth communication expressed in the second protocol from the fourth communication at the server, transmitting the sixth communication from the server to the client over the second communications link by using the second communications protocol, receiving the sixth communication at the client over the second communications link; and regenerating the fourth communication from the sixth communication at the client; and the step of terminating only lower layers of the first communications protocol comprises the steps of generating a seventh communication expressed in all layers of the first communications protocol from the second communication at the server, transmitting the seventh communication from the server over the first communications link by using the first communications protocol, receiving an eighth communication expressed in all layers of the first communications protocol over the first communications link at the server, and generating the fourth communication from the eighth communication at the server.

* * * * *